United States Patent
Wobben

(10) Patent No.: US 8,052,396 B2
(45) Date of Patent: Nov. 8, 2011

(54) METHOD FOR ASSEMBLING/DISMOUNTING COMPONENTS OF A WIND POWER PLANT

(76) Inventor: Aloys Wobben, Aurich (DE)

( * ) Notice: Subject to any disclaimer, the term of this patent is extended or adjusted under 35 U.S.C. 154(b) by 293 days.

(21) Appl. No.: 10/516,570

(22) PCT Filed: May 23, 2003

(86) PCT No.: PCT/EP03/05401
§ 371 (c)(1),
(2), (4) Date: Sep. 14, 2005

(87) PCT Pub. No.: WO03/102409
PCT Pub. Date: Dec. 11, 2003

(65) Prior Publication Data
US 2006/0151767 A1     Jul. 13, 2006

(30) Foreign Application Priority Data
Jun. 1, 2002   (DE) .................. 102 24 439

(51) Int. Cl.
*F03D 11/04*   (2006.01)
(52) U.S. Cl. .................. 416/244 R; 416/DIG. 6; 290/44
(58) Field of Classification Search ............. 416/244 R, 416/119, 142, DIG. 6; 290/55, 54, 44
See application file for complete search history.

(56) References Cited

U.S. PATENT DOCUMENTS

| | | | |
|---|---|---|---|
| 3,829,064 A * | 8/1974 | Jackson ........................ 254/323 |
| 4,236,873 A | 12/1980 | Sherman et al. .......... 416/204 R |
| 4,266,911 A | 5/1981 | Helm et al. ....................... 416/9 |
| 4,311,434 A | 1/1982 | Abe ............................... 416/142 |
| 4,412,784 A | 11/1983 | Wackerle et al. ............. 416/230 |
| 6,494,437 B1 * | 12/2002 | Boyer ............................ 254/323 |
| 7,207,777 B2 * | 4/2007 | Bervang ........................ 416/119 |
| 2001/0038207 A1 | 11/2001 | Willis et al. ...................... 290/55 |
| 2001/0038208 A1 | 11/2001 | Willis et al. | |
| 2006/0175465 A1 | 8/2006 | Teichert .......................... 244/33 |

FOREIGN PATENT DOCUMENTS

| | | |
|---|---|---|
| DE | 29603278 | 6/1996 |
| DE | 19726408 | 3/1999 |
| DE | 10111523 | 9/2002 |
| EP | 1 101 934 A2 | 5/2001 |
| EP | 1 101 936 A2 | 5/2001 |
| EP | 1239150 | 9/2002 |
| JP | 6313028 | 3/1988 |
| JP | 351182 | 5/1991 |
| JP | 6135692 | 5/1994 |
| WO | WO 96/10130 | 4/1996 |
| WO | 03048569 | 6/2003 |
| WO | 2004022970 | 3/2004 |

OTHER PUBLICATIONS

Hau, Erich, *Windkraftanlagen*, Springer-Verlag, Germany, 1988, 353 pages.

* cited by examiner

*Primary Examiner* — Edward Look
*Assistant Examiner* — Dwayne J White
(74) *Attorney, Agent, or Firm* — Seed IP Law Group PLLC

(57) ABSTRACT

A wind power installation having at least one cable passage means for passing through a hauling cable from a winch and a method of fitting/removing components of a wind power installation comprising laying a hauling cable from the winch to at least one deflection roller and further to the component to be fitted/removed, attaching the hauling cable to the component, and releasing and letting down or pulling up and fixing the component.

8 Claims, 4 Drawing Sheets

US 8,052,396 B2

METHOD FOR ASSEMBLING/DISMOUNTING COMPONENTS OF A WIND POWER PLANT

BACKGROUND OF THE INVENTION

1. Field of the Invention

The present invention concerns a wind power installation and a system and method of fitting/removing components of a wind power installation.

2. Description of the Related Art

Wind power installations have long been known. The considerable dimensions and weights of modern installations means that on the one hand components frequently have to be transported individually to the building site. There the components are then fitted together. In that respect in the meantime loads of 50 tons and more certainly have to be lifted.

On the other hand loads also have to be lifted to a considerable height of over 100 meters. Admittedly winches are known in wind power installations, but those winches are mostly disposed in the rear part of the pod of the wind power installation.

In addition a load-lifting apparatus on a wind power installation is known from WO 96/10130. In that known load-lifting apparatus, a winch is arranged on a machine frame. A hauling cable passes from the winch by way of a pivotable linkage. Such a load-lifting apparatus is provided on any wind power installation. In that respect the size of the load-lifting apparatus provided on any wind power installation is dependent on the required carrying capacity and therefore increases with the size of the wind power installation or with the weight of the components thereof.

Alternatively, as will be appreciated, lifting operations are possible using appropriately large cranes with a suitable load-bearing capacity, which once again can only be provided at a high level of complication and expenditure. As the expenditure involved in operating such a crane, that is to say dismantling it, operating it and again setting it up, is considerable, the crane generally remains on a wind power installation until the erection of the installation has progressed to such a degree that the crane is no longer required there. It is only then that the crane is transported to the next building site. In that respect the distance between those building sites represents a secondary consideration for the working operations required for relocating a crane always have to be carried out, irrespective of whether it is relocated only by some hundred meters or by some hundred kilometers.

It will be appreciated that the replacement of components of a wind power installation such as for example the rotor blades also requires a crane which has to be transported, with attendant expenditure.

BRIEF SUMMARY OF THE INVENTION

In one aspect, a wind power installation of the kind set forth in the opening part of this specification comprises at least one deflection roller and at least one cable passage in the region of the pylon head for passing therethrough a hauling cable from a winch.

In another aspect, a method of fitting/removing components of a wind power installation comprises:

laying a hauling cable from the winch to at least one deflection roller in the region of the pylon head and further to the component being fitted/removed, attaching the hauling cable to the component, and releasing and letting down or pulling up and fixing the component.

One embodiment is based on the realization that at least a part of the components of a wind power installation can be fitted or replaced even without the aid of a crane if a suitable lifting apparatus is available. The solution according to one embodiment avoids expensive and complicated additional installations on any wind power installation. Nonetheless a versatile lifting apparatus is quickly available at low cost.

In another aspect, the winch which is already present in the rear part of the pod can also be used in the front region of the pod without the position of the winch within the pod having to be altered.

In another aspect a system comprises a cable passage means in the pod for passing therethrough a hauling cable from a winch at the base of the wind power installation. In that way it is possible to use a sufficiently strong winch with a sufficiently load-bearing hauling cable for lifting and lowering heavy components so that even such components can be fitted or replaced without the use of a crane. It is accordingly completely sufficient for the winch to be transported to the wind power installation, for its hauling cable to be pulled up into the pod with the winch present in the wind power installation, for the hauling cable to be there laid over the deflection roller or rollers, and for the corresponding fitting/removal procedures to be carried out. In that respect the expense involved in transporting a winch is naturally considerably lower than that involved in transporting a sufficiently powerful and in particular sufficiently large crane.

In another embodiment of the invention there is provided a holding arrangement for an additional winch, the holding arrangement being fixedly connected to the foundation. That also already attains the object of reliably anchoring that winch in a simple fashion so that the winch can be correspondingly quickly used when it has arrived at its destination.

BRIEF DESCRIPTION OF THE SEVERAL VIEWS OF THE DRAWINGS

Further advantageous embodiments of the invention are set forth in the appendant claims.

The invention is described in greater detail hereinafter with reference to the Figures in which.

DETAILED DESCRIPTION OF THE INVENTION

Figure 1:
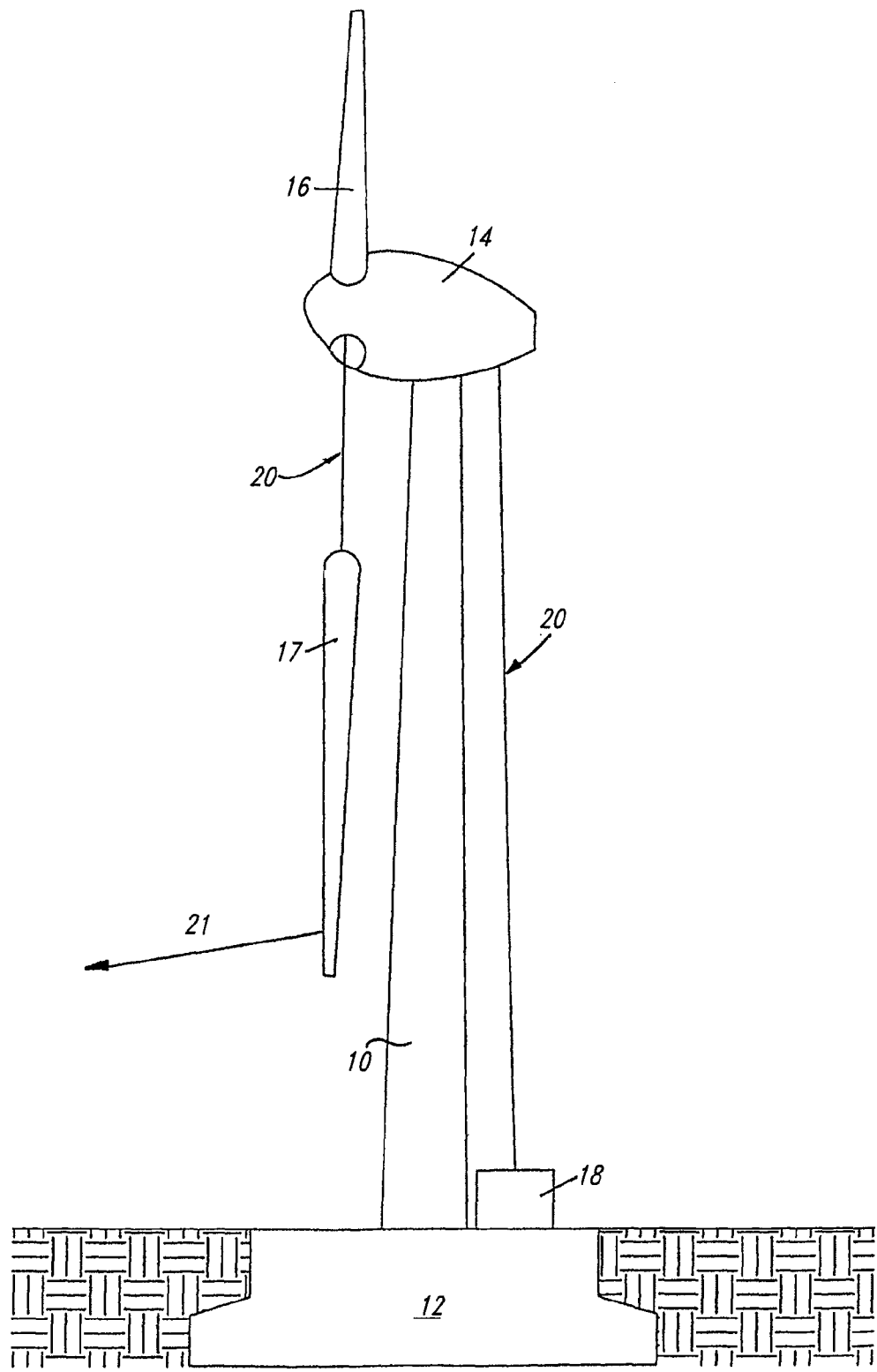
FIG. 1 shows a wind power installation having a winch arranged at the base of the pylon.

In FIG. 1 a pylon 10 of a wind power installation is anchored on a foundation 12. Disposed at the tip of the pylon 10 is a pod 14 to which a first rotor blade 16 is fixed.

At the base of the pylon 10 a winch 18 is also anchored on the foundation 12. A hauling cable 20 extends from the winch 18 at the rear side of the pylon 10 (for viewing this the front side and the rear side of the pylon 10 are those sides at which the corresponding portions of the pod 14 are disposed) to the pod 14, it passes through the pod and issues from the pod 14 again at a fitting opening provided for a second rotor blade 17 and extends downwardly to the rotor blade 17 which is fixed to that hauling cable and which is pulled up or let down towards the ground by the winch. Illustrated at the second rotor blade 17 is an arrow 21 which symbolizes the use of a guide cable 21. The use of a guide cable 21 makes it possible for the rotor blade 17 to be guided in a suitable fashion so that it cannot unintentionally strike against the pylon 10. In addition such a guide cable 21 can ensure that, when it is being let down, the rotor blade 17 is not set down with its tip on the ground and suffers damage, but it can be pulled in the direction of the arrow and can thus be guided into a horizontal position.

Figure 2:
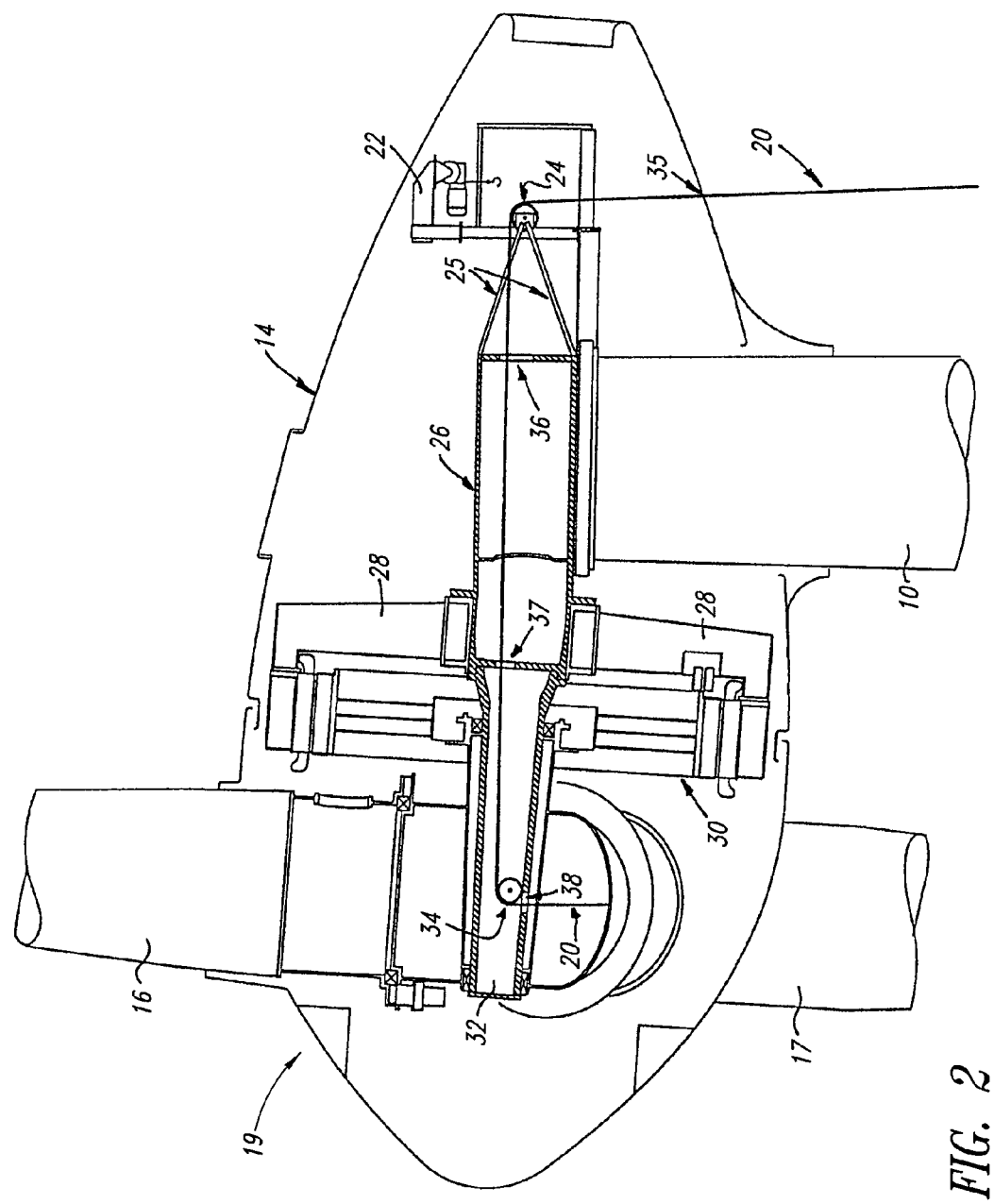
FIG. 2 shows a simplified view in cross-section of the pod with a first embodiment of the invention.

FIG. 2 shows a simplified view in cross-section of the pod 14. This Figure shows the head portion of the pylon 10. Disposed on that head portion of the pylon 10 is a machine carrier 26 which carries the stator carrier 28 with the stator 30. The machine carrier 26 also carries a shaft trunnion 32. Rotatably mounted on the shaft trunnion 32 is the rotor having the rotor blades 16, 17 and the rotor member 30 of the generator.

Disposed at the side of the machine carrier 26, which is remote from the stator carrier 28, is a winch 22 which is already provided as standard in most wind power installations. Also provided there are holding bars 25, with a first deflection roller 24 being provided at the ends of the holding bars 25, which are remote from the machine carrier 26. A second deflection roller 34 is disposed within the shaft trunnion 32.

The Figure also illustrates the hauling cable 20 which passes into the pod 14 at the rear side. In this case the passage opening 35 for that hauling cable 20 can also be a closable opening which is provided in any case beneath the winch 22 in the bottom of the pod 14.

After passing into the pod 14 the hauling cable 20 passes over the first deflection roller 24 through a second cable passage means 36 (the first cable passage means as illustrated in FIG. 2 is accordingly the passage opening 35 in the bottom of the pod 14), through a third cable passage means 37 to the deflection roller 34 and from there to a fourth cable passage means 38 in the shaft trunnion 32, for example to the rotor blade 17 which is to be moved.

Pulling up the hauling cable 20 or letting it down on the way between the pod 14 and the winch 18 on the foundation 12 of the pylon 10 can be assisted by the winch 22.

Figure 3:
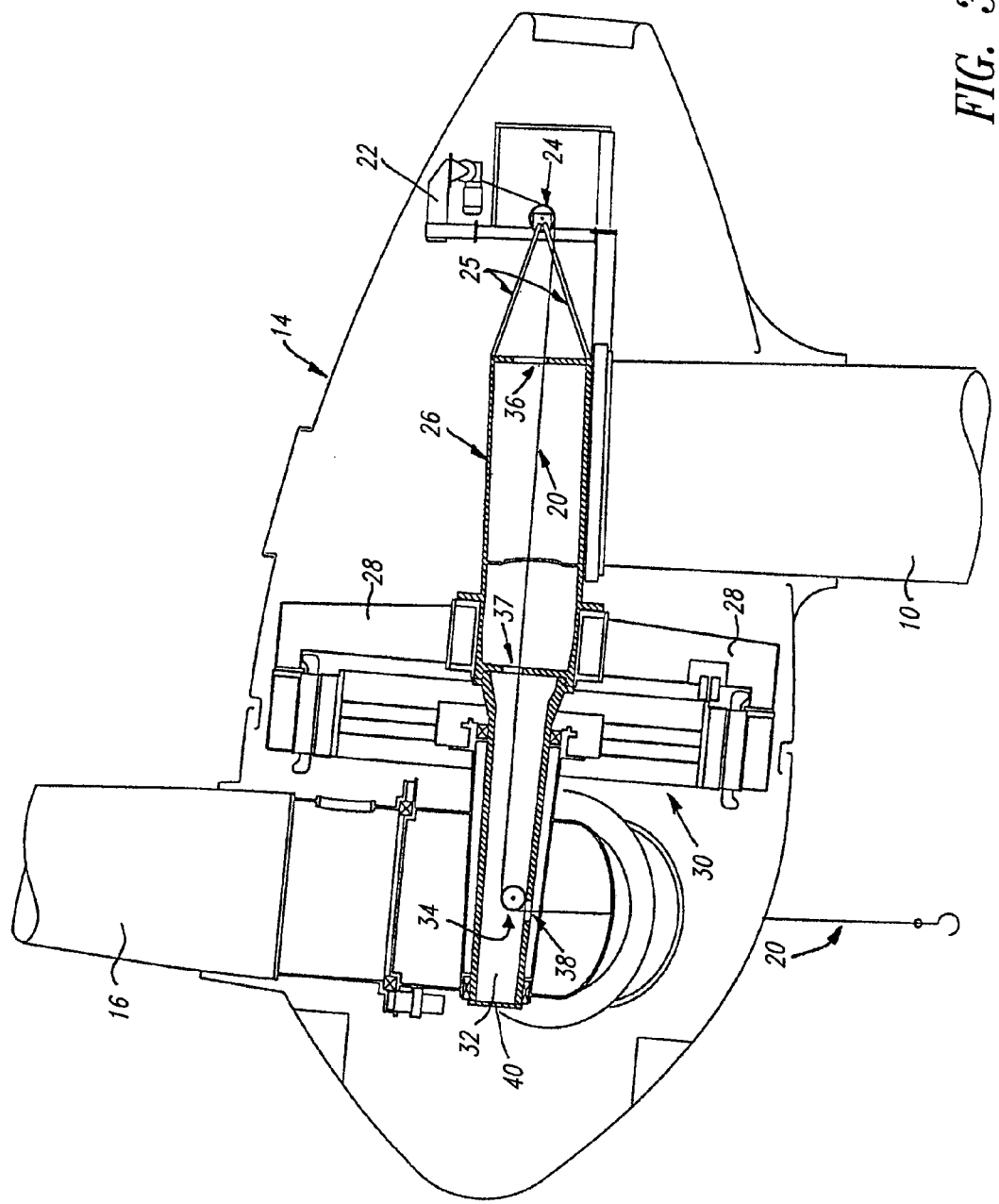
FIG. 3 shows a simplified view in cross-section of the pod with a second embodiment of the invention.

FIG. 3 shows a second embodiment of the invention. The components in FIG. 3 are denoted by the same references as those in FIG. 2. One difference in relation to the first embodiment of the invention as shown in FIG. 2 is that in the embodiment of FIG. 3 the cable of the winch 22 which is provided in any case in the wind power installation is used as the hauling cable 20. The carrying capacity of that winch is admittedly limited, but nonetheless it is possible to lift components of relatively low weight, for example through the rotor blade opening, into the front part of the pod 14. Mention may be made here by way of example of a pitch motor (not shown), that is to say a motor which serves to adjust a rotor blade. Otherwise that motor would have to be lifted into the rear part of the pod 14 and from there transported into the front part, in a complicated procedure. That naturally presupposes that the rotor blade opening is open and is not closed off by a rotor blade.

As can be clearly seen from FIG. 3, the cable run passes from the winch 22 by way of the first deflection roller 24, through the second cable passage means 36, the third cable passage means 37, by way of the second deflection roller 34 and through the fourth cable passage means 38.

In an alternative embodiment, a cable guide means or deflection roller can be arranged above the head portion of the pylon 10 so that the cable 20 can then be let down into the interior of the pylon 10 or pulled up out of same. In that way also loads within the pylon 10, in particular in the region of the base of the pylon 10, for example power cabinets, transformers, etc can be raised or lowered if required by way of the cable 20, which is advantageous if those parts have to be moved out of the base region of the pylon, which is usually effected by way of side doors in the pylon 10 which however are not all at the level of the component in question which is to be replaced.

Instead of a simple deflection roller, it is also possible to provide any other kind of cable guide means in which the cable can be guided. For example, any suitable cable guide can be employed to guide the cable 20 into the pylon 10 through the machine carrier 26.

A further alternative can also provide that the winch 18 itself is not disposed outside the pylon 10 but within the pylon 10 in the region of the base thereof. Then the hauling cable 20 is always disposed in a protected condition within the installation and raising and lowering of cargo is possible at a plurality of locations, on the one hand in the region of the rear of the pod (by way of the deflection roller 24), at a further location in the region of the hub 19 (by way of the roller 38), and it is also possible to lower components within the pylon 10.

It is also possible to provide a further deflection roller (in the manner of the roller 38) which is disposed in the region of the hub tip 40 so that the cable 20 can be guided out of the hub 19 of the wind power installation past the rotor blades. In that way loads can then be lifted from the ground into the region of the rotor hub, more specifically also past the rotor blades. If that load is for example a working platform, it is possible for the personnel to move up and down directly at the rotor blades on the outside in order to inspect the rotor blades or if necessary to carry out service or cleaning procedures.

It will be appreciated that where necessary, further cable guide or deflection rollers can be provided within the machine carrier 26, the pylon 10, the pod 14 or the hub 19 of the pod 14, without that needing to be particularly mentioned at this juncture.

If a winch which is disposed at the base of the wind power installation is used, that also does not necessarily have to be fixedly connected to the foundation of the wind power installation, but can also be mounted in an open condition to a transport vehicle (omitted from the figures for ease of illustration) and can be connected thereto so that highly flexible use of the winch is possible. It is also possible for the winch to be fixed on a support frame structure so that a sufficiently great counterweight is provided when desired.

Figure 4:
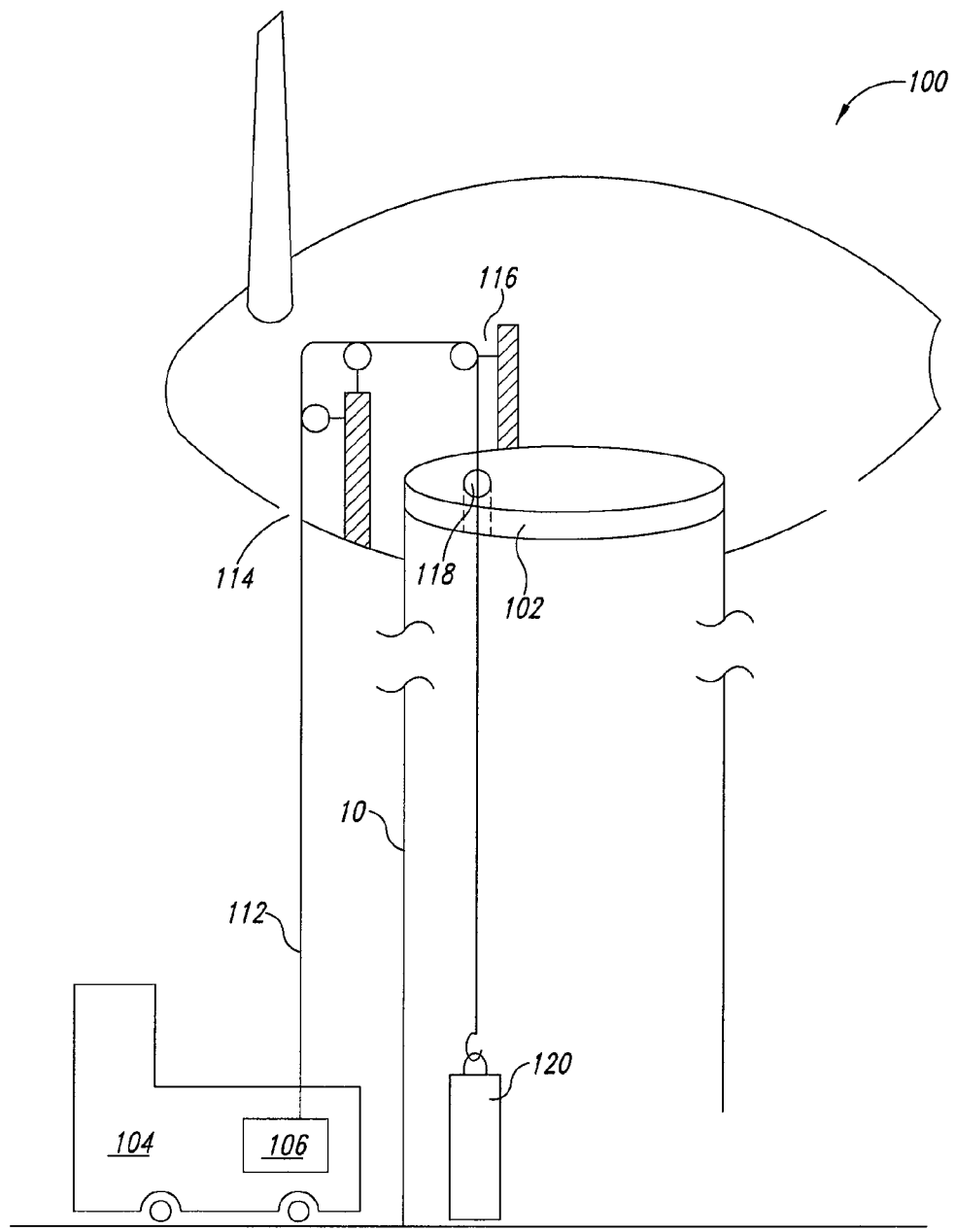
FIG. 4 illustrates another embodiment of a wind power installation.

FIG. 4 illustrates a wind power installation 100 having a pylon 10 having a head 102. A vehicle 104 has a winch 106 mounted to it. The vehicle 104 is positioned so that the winch 106 is outside the pylon 10. A cable 112 is coupled to the winch 106, passes through a first cable passage means 114, a second cable passage means 116, which is located above the head 102 of the pylon 10, and a third cable passage means 118. The cable 112 may be used to raise and lower an object inside the pylon 10, such as a component of the wind power installation 120.

From the foregoing it will be appreciated that, although specific embodiments of the invention have been described herein for purposes of illustration, various modifications may be made without deviating from the spirit and scope of the invention.

The invention claimed is:

1. A wind power installation comprising:
   a pylon having a head;
   a winch;
   at least one deflection roller;
   at least one cable passage means in the region of the pylon head for passing therethrough a hauling cable from the winch, wherein the winch is mounted on a vehicle at the base of the wind power installation, without using a crane separate from the pylon to support the winch;

a pod, wherein the at least one cable passage means is in the pod and is configured to pass through the hauling cable from the winch at the base of the wind power installation; and a plurality of holding bars rigidly positioned in a rear portion of the pod, the holding bars supporting the at least one deflection roller within an interior space of the rear portion of the pod to guide the hauling cable.

2. A wind power installation as set forth in claim 1, further comprising a holding arrangement fixedly connected to a foundation, for an additional winch.

3. A wind power installation as set forth in claim 1, further comprising a second cable passage means disposed above the pylon head and configured to facilitate raising and lowering components of the wind power installation within the pylon.

4. A method of fitting/removing components of a wind power installation comprising:

transporting a winch mounted on a transport vehicle to a base of the wind power installation;

laying a hauling cable from the winch to at least one deflection roller in a pod that is coupled to a pylon head of the wind power installation, the at least one deflection roller supported by a plurality of holding bars rigidly positioned in a rear portion of the pod within an interior space of the rear portion of the pod to guide the hauling cable to a component to be fitted/removed;

attaching the hauling cable to the component; and releasing and letting down or pulling up and fixing the component.

5. A method as set forth in claim 4 further comprising placing a second winch at the base of the wind power installation.

6. The wind power installation as set forth in claim 1, wherein the at least one deflection roller is positioned to guide the hauling cable through at least one bearing that rotatably supports a rotor of the wind power installation toward a component to be fitted/removed.

7. The wind power installation as set forth in claim 6, wherein the pod includes a blade mount opening, and further comprising a cable guide in the pod positioned to guide the hauling cable toward the blade mount opening after the cable passes through the at least one bearing.

8. A wind power installation comprising:

a pylon;

a pod coupled to an upper end of the pylon, the pod including an opening for passing therethrough a hauling cable from a winch positioned at the base of the wind power installation;

at least one deflection roller; and a plurality of holding bars rigidly positioned in a rear portion of the pod, the holding bars supporting the at least one deflection roller within an interior space of the rear portion of the pod to guide the hauling cable.

\* \* \* \* \*